United States Patent Office 3,623,194
Patented Nov. 30, 1971

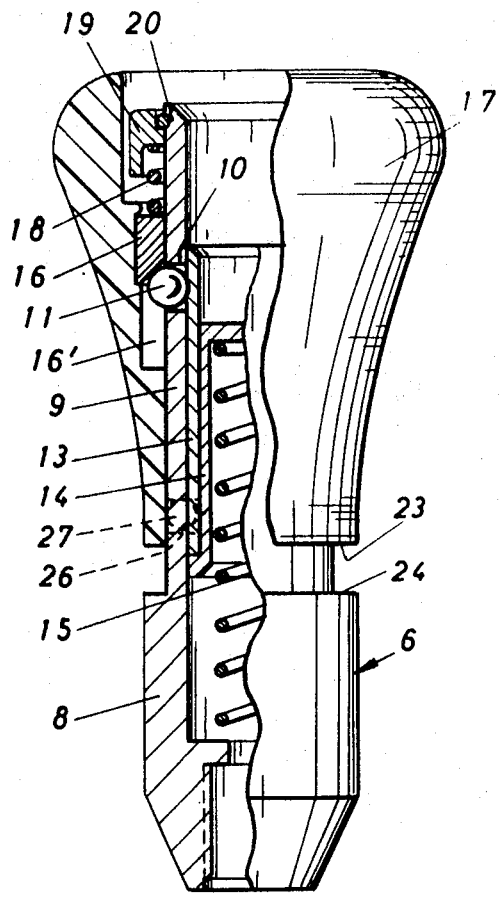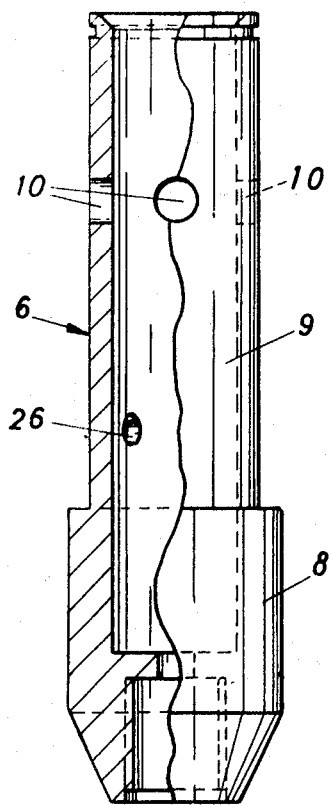

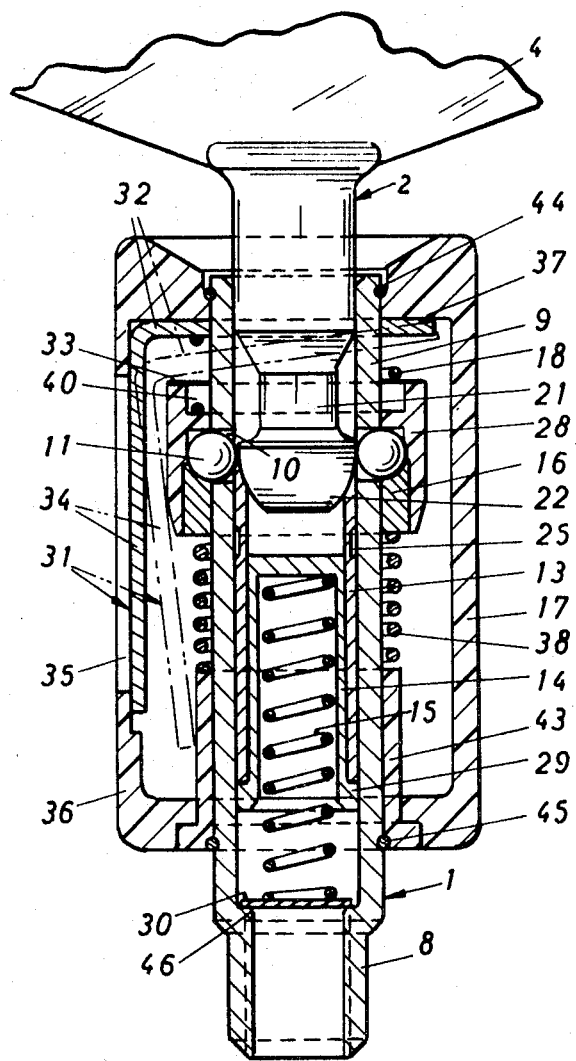

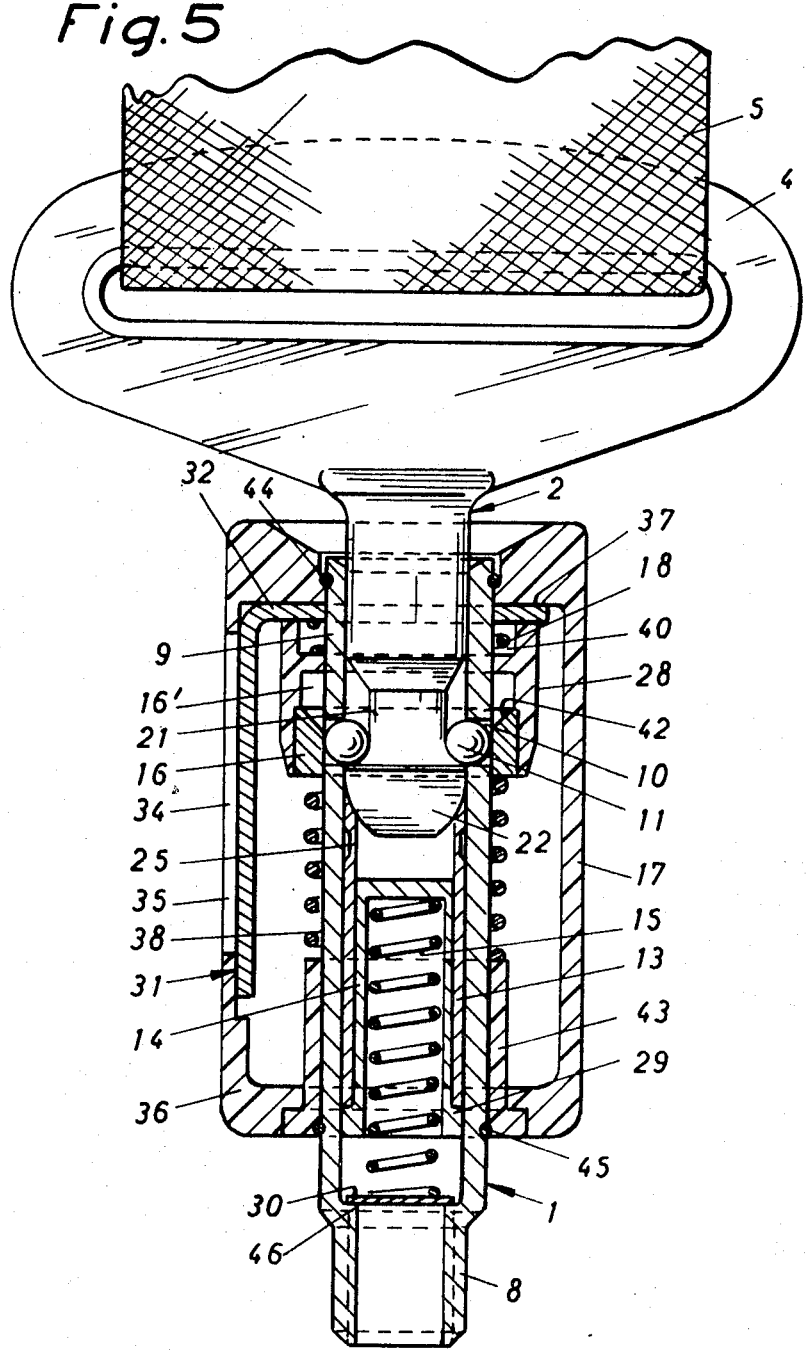

3,623,194
QUICK RELEASE COUPLING, PARTICULARLY FOR SAFETY HARNESSES FOR CARS
Carl Erik Claeson, Molndal, and Sten Axel Magnus Smederod, Goteborg, Sweden, assignors to Goteborgs Bandvaveri AB, Goteborg, Sweden
Filed Dec. 15, 1969, Ser. No. 885,207
Claims priority, application Sweden, Dec. 19, 1968, 17,425/68
Int. Cl. A44b 17/00
U.S. Cl. 24—211 N
8 Claims

ABSTRACT OF THE DISCLOSURE

A snap fastener of the type in which a grooved locking pin is retained in releasable axial engagement in a housing by means of locking balls which are held in a non-locking position by a spring loaded bush until the latter is displaced by insertion of the pin, is provided with a safety member preventing said displacement being inadvertently causes by the insertion of an article of even slightly less diameter than the pin. An axially movable spring loaded ring holds the balls in locking engagement with the pin groove, said ring is moved to release the pin by pulling an axially movable knob or by pressing an arm of a lever pivoted on the housing.

BACKGROUND OF THE INVENTION

The present invention relates to a snap closure, especially for use as a buckle device for safety belts in vehicles. At present the closures used for this purpose are all more or less difficult to handle, but all seem to have in common that the two parts to be connected in the closure can only be assembled in a specific rotary position, so that the use of safety-belts is often found to be inconvenient, and consequently they are not used.

The object of the present invention is to provide an easily handled and quickly operable closure, whose correct application and snapping together needs na particular attention on the part of the user.

SUMMARY OF THE INVENTION

For this purpose the invention relates to a snap fastener, comprising a housing and a locking pin insertable therein and with members for co-operating with locking balls disposed in the housing, said balls being maintained in non-locking position by a spring-loaded bush, and being brought into locking engagement with the locking pin on insertion of said pin into the housing, whereon the pin displaces the spring-loaded bush axially inwards.

This type of snap closure has however the disadvantage that the bush which holds the locking balls in inoperative position, when the locking pin is not inserted in the casing, can be displaced by articles not intended to do so into a position which frees the balls. This would have the consequence of needing special means to return the bush to its ready position. The present invention therefore relates to a snap closure of the type indicated, characterised by a safety member which prevents displacement of the bush and release of the locking balls by the introduction of devices other than the locking pin. This safety member can be a relatively thin-walled bush, so that the bush which keeps the locking balls in-operative, i.e. non-locking, position cannot be moved by a rod-shaped article which is of even slightly less diameter than the locking pin.

The above-described snap closure is thus actuated by manual displacement in a longitudinal direction of the housing surrounding the device. Since the ring mounted on the bush inside the housing is sildably mounted on the bush, the axial movement of this ring needed to actuate the fastener is made relative to the bush. It may however happen that with the safety belt stretched, the snap closure may in particular circumstances be jammed against some other article, so that operation thereof is made difficult if not impossible.

Simpler operation of the snap closure is therefore desirable, and according to a further development of the present invention is possible by means of a pressure lever, whose one arm when intentionally actuated moves the ring drawn over the bush and slidable thereon from the outer end of the transeverse channels in the bush wherein the locking balls are inserted.

With the aid of this operating device, only a slight pressure of the finger tips on the pressure lever is needed to release the fastener, even when the safety belt is under extreme tension. This is of very great importance, since rapid actuation of the closure must be possible, even for instance in the case of a person injured in a traffic accident, who may be in such a constrained position or such a weakened condition that he cannot apply any considerable force to the closure.

BRIEF DESCRIPTION OF THE DRAWINGS

FIG. 2 is the snap closure in the ready position;
FIG. 3 is a detail of the closure;
FIG. 4 is a vertical section through a second embodiment of the snap closure, in the partially inserted and projecting position;
FIG. 5 is a view corresponding to FIG. 4, showing the snap closure in the locked position.

DETAILED DESCRIPTION OF A PREFERRED EMBODIMENT

Figure 1:
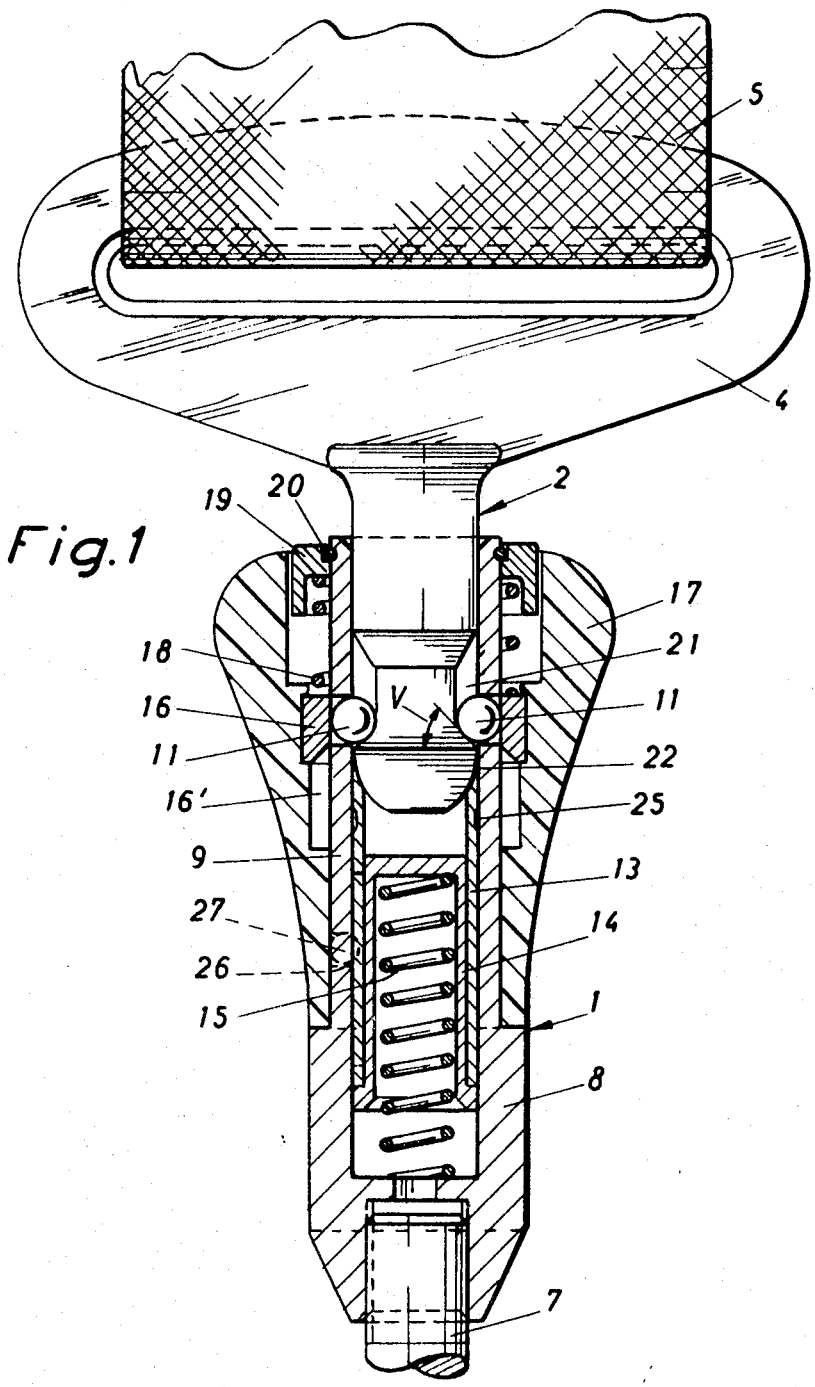
FIG. 1 is a first embodiment of a snap closure provided by the invention, in locked position.

The snap closure in the embodiment shown in FIGS. 1–3 comprises a housing 1 and a locking pin 2, whereby as in FIG. 1 the housing 1 is affixed to the floor of a vehicle, and the locking pin 2 is provided with an eye 4 wherein is fitted a safety belt 5.

The housing 1 comprises a tubular part 6, affixed to the vehicle floor by a threaded bolt 7. This tubular part is shown separately in FIG. 3, and consists as shown for instance in this drawing of a lower thick portion 8 and an upwardly extending extension 9. Four transverse round holes 10 are provided in the extension 9 to take the locking balls 11 shown in FIGS. 1 and 2. In the ready position shown in FIG. 2, the locking balls 11 are held in inoperative position by a bush 13, itself held in this position by an inner spring-loaded guide sleeve 14. This inner guide sleeve 14 is forced into the position shown in FIG. 2 by the effect of a pressure spring 15.

In the ready position, a ring 16 with a chamfered lower edge is also forced upwards by the locking balls 11, and the ring 16 in turn forces a knob 17 upwards as seen in the drawings. Between ring 16 and a ring 19 is disposed a pressure spring 18, said ring 19 being held at the upper end of the tubular extension 9 by means of a lock ring 20.

The locking pin 2 has a recess 21 for engaging the locking balls 11. The angle V shown in FIG. 1 is preferably about 30°, which will be referred to again below.

The snap closure provided by the invention functions as follows: the description proceeds from the ready position shown in FIG. 2. When the head 22 of the locking pin 2 is inserted in the housing 1, this head 22 moves the bush 13 together with the inner guide sleeve 14 in a downward direction, compressing the pressure spring 15. As soon as the bush 13 has its upper edge beneath the transverse holes 10, it frees the locking balls 11, so that these, when the head 22 of locking pin 2 has also passed the holes 10, are pressed under the force of spring 18 and by means of ring 16 into the recess 21, with the knob 17 also following this movement until its lower edge 23 strikes the step 24 on the thicker part 8 of the tubular portion 6. The snap closure is now in the locking position shown in FIG. 1. If, as already mention above, the angle V is about 30°, operation of the snap closure only requires a small force, even if the safety belt is to be subjected to high loads, which can easily be the case as a result of a traffic accident.

If it is desired to open the snap closure, the knob 17 is held by two fingers and pulled upwards, so that the ring 16 is taken to a position above the transverse holes 10 and the locking balls 11 can enter the cavity 16' below the ring 16, so that the pressure spring 15 can force the locking pin 2 out of the housing 1 by means of the bush 13 and sleeve 14.

This construction is very simple to operate, since only the locking pin 2 need be inserted in the housing 1, the relative rotational position of the two parts being immaterial. In spite of its reliable coupling, release of the closure is also very simple, since only two fingers of one hand (not even the use of the thumb is required) are needed to move the knob 17 slightly upwards, whereupon the pressure spring 15 completes the release of the snap closure.

In order however that a snap closure of the above-mentioned type may not be moved from the ready position to the locked position without insertion of a locking pin 2, according to the present invention the closure is so formed that if a rod-shaped article with a diameter slightly less than that of head 22 of the locking pin should be applied, this article cannot displace the bush 13, but merely forces down the inner guide sleeve 14 so that the locking balls 11 do not leave their inoperative position. To increase this security, the bush 13 is provided with a circumferential groove 25, in which the locking balls 11 engage in the ready position, as shown for instance in FIG. 2.

It is also conceivable to provide the device with a single spring-loaded bush instead of the bush 13 and sleeve 14. The protection against unintentional operation can then be maintained by providing a rod or the like extending into the bush, and engaging a corresponding hole in the locking pin 2.

Guidance of bush 13 is also provided by an aperture 26 in the tubular part 6, wherein may be lodged a ball 27 for engaging in a longitudinal slot in the bush 13.

As with the first embodiment, the snap closure in the embodiment shown in FIGS. 4 and 5 also comprises basically a housing and a locking pin 2, the housing 1 being preferably affixed to the floor or the drive shaft housing of a vehicle, and the locking pin 2 having an eye 4 wherein is disposed a safety belt, as for instance in FIG. 5.

At its lower end the housing 1 has a somewhat narrower part 8 with an internal thread wherein may be screwed a bolt passing through the vehicle floor. In the upper part 9 of housing 1 are disposed four radially directed channels 10 at the same level, in each of which is inserted a locking ball 11.

The locking pin 2 is provided with a recess 21 for engagement with the locking balls 11, and at the bottom of the locking pin is formed a head 22, preferably somewhat rounded at the bottom.

The operating movement of locking balls 11 is provided by a ring 28 movable axially along a short stretch at the upper end and the outside of housing 1. This ring 28 is formed with an annular cavity directed radially inwards and which together with the channels 10 holds the locking balls in their inoperative position, and is provided with a ring, preferably of metal or the like, to take the locking balls into locking engagement with the pin 2, as will be described in detail below.

In the intermediate position shown in FIG. 4, the locking balls 11 are urged by the head 22 of locking pin 2 and also by a bush 13 which is held in its position by a flange 29 on the interior guide sleeve 14. This sleeve 14 is in turn forced upwards by the force of a pressure spring 15 into the position shown in FIG. 4; the said spring 15 has its lower end resting against a round disc 30 resting on an annular step 46 in the lower inner end of housing 1.

In this embodiment the downward axial movement of ring 28 needed for release, i.e. for opening the snap closure, is produced by an angle lever 31, whose one arm 32 lies against the surface 33 of ring 28 opposite the upper part 9 of housing 1, and whose second arm 34 extends substantially lengthwise of housing 1. This arm 34 can be reached from the outside through an aperture 35 in a housing 36 completely surrounding the snap closure, and when pressed inwards tilts the angle lever 31 about the free end 37 of arm 32 which lies against the inside of housing 36, and this causes ring 28 to move downwards. The axial upward motion of ring 28 required for locking the closure is provided by the force of a pressure spring 38 which is held between the ring 28 and an annular seating 43 made of plastic or the like and fixedly disposed on the housing 1. Return of the angle lever 31 to its initial position after it has been pressed inwards is effected by a pressure spring 18 extending between the arm 32 and the ring 28, the top of said ring being provided with a circualr recess 40 by which the pressure spring 18 is completely enclosed when in the compressed condition, which permits the required abutment between the pressure lever arm 32 and the ring 28. Here an important feature for the functioning of the snap closure is that the last-mentioned pressure spring 18 has a considerably smaller compression force than the pressure spring 38 which presses upwardly the ring 28. In the upper part of the housing 1 and in the lower part are also inserted locking rings 44, 45, which serve to guide the sleeve when moving axially downwards in relation to the housing 36, and to hold the seating 43 against the sleeve under the effect of spring 38.

From the above description it will be seen that when the locking pin 2 is not inserted in the housing 1, the bush 13 is held in an upper position through the effect of the inner sleve 14 and of pressure spring 15. The locking balls are then held in inoperative, i.e. non-locking position, with one half of the balls 11 disposed in the channels 10 and their other half in the annular cavity 16' in ring 28. It is assumed that this ring 28 has taken up its lower position, with the cavity 16' immediately in front of the channels 10. The annular groove 25 in the bush 13 for engaging the locking balls 11 also avoids the danger of bush 13 sliding out of the closure.

When the locking pin 2 is inserted in the casing 1, the bush 13 is moved downwards by the head 22 of the locking pin 2 (FIG. 4). The locking balls 11 are thus kept in their non-hindering position, until both the upper edge of bush 13 and the head 22 of locking pin 2 have passed the channels 10 wherein are disposed the locking balls 11. As soon as the recess 21 in locking pin 2 comes to lie directly in front of the channels 10, the locking balls 11 are partly forced into the recess, since the ring 28 is constantly endeavouring to force the locking balls 11 radially inwards. This is due partly to the pressure spring 38 endeavouring to push the ring 28 axially upwards, the partly to the ring 16 being chamfered on its upper edge 42 in a manner clearly seen in FIG. 5. The ring 28 is thus simultaneously pushed upwards until its upper edge 33 comes into abutment against the arm 32 of angle lever 31. This places the ring 16 immediately in front of the outer ends of the transverse channels formed in the bush, so that the locking balls 11 remain in their radially inward terminal position, wherein their one half lies in the recess 21 in the locking pin 2 and the other half in the channel 10 concerned. The position adopted is thus that of FIG. 5, wherein the snap closure is fully locked.

In order to open the snap closure, the angle lever arm 34 is pressed inwards whereupon, as previously explained, the pressure lever 31 is tilted about the free end 37 and the ring 28 is moved axially downwards (the resultant poistion of the pressure lever 31 is shown in dotetd lines in FIG. 4). The ring 28 then assumes again the position shown in FIG. 4, wherein the annular cavity 16' is immediately in front of the channels 10. The inner sleeve 14 and the bush 13 are forced upwards by the effect of the compressed pressure spring 15, so that the locking pin 2 is forced out of the housing 1, and the locking balls 11 are pressed radially outwards by the pin head 22 to put about half their volume into the annular cavity. The ring 28 is thus held retracted in this position until the inwards pressure on pressure lever 31 stops and this lever once again asumes its initial position under the force of pressure spring 18. The snap closure is now open and ready to receive the locking pin 2 for consequent locking.

Formation of the closure with the bush 13 and sleeve 14 avoids the danger that a foreign body with a diameter somewhat less than that of the head 22 on the locking pin can be inserted into housing 1 and hence displace the bush 13 which holds the locking balls 11 in the non-locking position. The locking balls are thus prevented from dropping down into the interior of casing 1, with the subsequent difficulty of returning these to the position allotted to them.

The embodiment shown and described are only to be considered as examples, and may be altered in various ways within the scope of the following claims. It is for instance conceivable to affix locking pin 2 to the vehicle floor and to provide housing 1 with the eye, whereupon the snap closure will function with the same benefits as the two embodiments described above. The snap closure can obviously also be used in many other fields than that described above, and be used to absorb tensional forces of various kinds. It is also possible to use magnetic forces to force the locking balls 11 into inoperative position and maintain them there. Finally, it should be stressed that the upper chamfer of cavity 21 as seen in the drawings is of importance when the head 22 of locking pin 2 should be inserted far enough for the locking pin 2 to turn in such manner that it finally falls from the housing 1. This rotary movement of locking pin 2 becomes greater if the upper opening in housing 1 is made to diverge upwardly, i.e. to be funnel-shaped, which may be advantageous to ease insertion of locking pin 2 in the housing 1. The pressure lever may be formed in various ways, e.g. as a slidable lever or the like. The pressure spring 15 can be disposed so that it acts directly on bush 13, which makes unnecessary the inner sleeve 14.

What we claim is:

1. A snap closure for safety belts for use in vehicles and the like, comprising a housing having an opening therein with a bore extending axially into said housing from the opening, a locking pin insertable through the opening into said bore in said housing, said locking pin having a rounded head at its end insertable into said bore and an annular recess extending circumferentially about said pin adjacent said head, said recess on said locking pin arranged to be positioned within said bore, said housing having channels therein opening into said bore, balls positioned within said channels and movably displaceable therethrough transverse to the axial direction of said bore, a ring member disposed about said housing and being displaceable in the axial direction of said housing, said ring member being arranged to direct said balls inwardly through said channels into said bore and to be displaced axially for releasing said balls for outward movement from said bore, axially displaceable means positioned within said bore for restraining said balls from projecting inwardly into said bore, said means comprising an outer sleeve, an inner sleeve and spring means, said outer sleeve being in sliding engagement with said bore and being displaceable between a first position where it is disposed opposite said channels in said housing and prevents said balls from entering into said bore and a second position where it is displaced axially from said channels for admitting said balls into said bore, said inner sleeve being located within and being axially displaceable relative to said outer sleeve, said inner sleeve arranged to engage said outer sleeve for axially displacing said outer sleeve, said spring means arranged to bias said inner sleeve against said outer sleeve for biasing said outer sleeve within said bore toward the opening thereto into its first position, and said head on said locking pin having a diameter greater than the inside diameter of said outer sleeve so that upon its insertion into said bore it axially displaces said outer sleeve against the biasing action of said spring means for uncovering said channels in said housing so that said balls can be displaced inwardly into said bore for locking engagement with said recess in said locking pin.

2. A snap closure, as set forth in claim 1, characterized in that a pressure lever means being positioned exteriorly of said housing and having a surface in contact with said ring member, said pressure lever means being pivotally displaceable for axially displacing said ring member so that said balls are released for outward displacement from engagement in said recess in said locking pin.

3. A snap closure, as set forth in claim 1, characterized in that a shell member being spaced outwardly from and laterally enclosing said ring member and at least a portion of said housing, said shell member having an opening therein, a pivotally mounted pressure lever arranged within said shell and having a first arm extending angularly from a second arm, said first arm disposed in contact with said ring member and said second arm being accessible through the opening in said shell member so that by pivotally displacing said second arm said first arm displaces said ring member and releases said ball for outward movement from locking engagement with said recess in said locking pin.

4. A snap closure, as set forth in claim 1, characterized in that said ring member cooperates with said housing and forms therewith a recess for receiving said balls when they are displaced outwardly from said bore, and an inwardly directed annular protuberance formed on the inside surface of said ring member and spaced in the axial direction from the recess formed with said housing whereby said protuberance is arranged to displace said balls inwardly into said bore when it is positioned opposite the channels in said housing.

5. A snap closure, as set forth in claim 4, characterized in that spring means being arranged for biasing said ring member into position for maintaining said protuberance in position for displacing said balls inwardly into said bore and for maintaining the locked engagement of said balls with said locking pin.

6. A snap closure, as set forth in claim 1, characterized in that said recess in said locking pin having an axial length which is greater than the diameter of said balls.

7. A snap closure, as set forth in claim 1, characterized in that said recess being formed inwardly into said locking pin immediately following said rounded head and having an inwardly curving concave surface extending from said rounded head which surface receives said balls in the locking position, and a plane extending tangentially to the point of engagement between said balls and said concave surface and a plane extending perpendicularly to the intersection of said round head and said concave surface forming an angle of about 30 degrees therebetween.

8. A snap closure, as set forth in claim 1, characterized in that said bore and locking pin having related transverse dimensions so that said locking pin can be inserted into said bore in any position rotated relative to the axis of said bore and insertion will be effected.

References Cited

UNITED STATES PATENTS 3,015,867   1/1962   Bronstein et al.   24—211 N X
3,430,305   3/1969   Geffner   24—211 N

FOREIGN PATENTS 897,080   5/1944   France   85—58

DONALD A. GRIFFIN, Primary Examiner